United States Patent [19]
Stark

[11] Patent Number: 5,276,255
[45] Date of Patent: Jan. 4, 1994

[54] CEMENTITIOUS ENCAPSULATION OF WASTE MATERIALS AND/OR CONTAMINATED SOILS CONTAINING HEAVY METALS, TO RENDER THEM IMMOBILE

[76] Inventor: J. Norman Stark, 22420 S. Woodland Rd., Shaker Heights, Ohio 44122

[21] Appl. No.: 999,286

[22] Filed: Dec. 30, 1992

[51] Int. Cl.$^5$ ............................ B09B 3/00; E02D 3/12
[52] U.S. Cl. .................... 588/257; 405/129; 405/266
[58] Field of Search ............ 588/249, 252, 256, 257; 405/128, 129, 263, 266

[56] References Cited

U.S. PATENT DOCUMENTS

| | | |
|---|---|---|
| 3,841,102 | 10/1974 | Cinner et al. |
| 3,980,558 | 9/1976 | Thompson . |
| 4,004,428 | 1/1977 | Tazawa et al. ................ 405/263 |
| 4,132,558 | 1/1979 | Uchikawa et al. ............ 588/257 |
| 4,142,912 | 3/1979 | Young . |
| 4,149,968 | 4/1979 | Kupiec et al. . |
| 4,336,069 | 6/1982 | Dodson et al. ............... 588/257 |
| 4,432,666 | 2/1984 | Frey et al. . |
| 4,701,222 | 10/1987 | Kobayashi et al. ........... 588/256 X |

Primary Examiner—David H. Corbin
Attorney, Agent, or Firm—Tarolli, Sundheim & Covell

[57] ABSTRACT

The present invention relates to the cementitious encapsulation of waste materials and/or contaminated soils containing heavy metals, to render them immobile, and particularly to the immobilization of metals, in regulated amounts, in such wastes. A waste product comprising the metals is provided. A mixture is prepared comprising said wastes and/or contaminated soils containing heavy metals, water, and a cementitious composition. The cementitious composition comprises magnesium oxide and magnesium chloride in proportions effective to produce, with said water, a magnesium oxychloride cement. The cementitious composition is present in an amount which, on setting, is effective to immobilize the metals in said waste and/or contaminated soils. The mixture of waste and/or contaminated soils and cementitious composition is introduced to a disposition site, and allowed to set and harden at said site. The present invention is particularly useful for the remedial treatment of landfill sites.

11 Claims, No Drawings

CEMENTITIOUS ENCAPSULATION OF WASTE MATERIALS AND/OR CONTAMINATED SOILS CONTAINING HEAVY METALS, TO RENDER THEM IMMOBILE

BACKGROUND OF THE INVENTION

1. Technical Field

The present invention relates to the cementitious encapsulation of waste material and/or contaminated soils containing heavy metals, to render them immobile, and particularly to the immobilization of heavy metals in such wastes and/or contaminated soils.

2. Description of the Prior Art

U.S. Pat. No. 3,841,102 teaches mixing waste material with an aqueous solution of an alkali metal silicate and a silicate setting agent. A preferred silicate setting agent is Portland cement. Portland cement is a calcined admixture of lime and clay, and contains basic calcium silicates, calcium aluminates, and calcium ferrites. The alkali metal silicate and silicate setting agent are reactive with each other and convert the admixture to a stable earth-like material. A leach test conducted on an admixture of waste material, alkali metal silicate, and silicate setting agent, wherein the waste material comprised heavy metals, produced a leachate having only small amounts of the heavy metals.

U.S. Pat. No. 3,980,558 discloses that processes using an alkali metal silicate and a silicate setting agent produce a highly porous solid having low compressive strength which is readily broken down to a dirt-like consistency from which toxic materials, such as arsenic, can be leached. In the '558 patent, an admixture is prepared which consists essentially of a liquid or semi-liquid waste having 30 to 40 percent by volume solids and a hydraulic cement. A type 1 Portland cement is preferred.

U.S. Pat. No. 4,142,912 discloses mixing arsenic, preferably in solid or slurry form, with a water-soluble alkaline earth metal salt or manganese salt, Portland cement, sand and water. The admixture sets to a rock-like substance which retains the arsenic component. Examples of water-soluble alkaline earth metal salts are calcium chloride, magnesium chloride, and magnesium sulfate. An example of a manganese salt is manganese chloride.

U.S. Pat. No. 4,149,968 discloses the treatment of an industrial waste containing metal ions. The waste is first treated with bentonite clay. The bentonite clay exhibits ion exchange properties in which the clay gives up sodium and potassium ions, and absorbs the metal ions. The admixture of industrial waste and bentonite clay is then mixed with Portland cement. The Portland cement, following setting, traps and binds the clay and contained waste materials.

U.S. Pat. No. 4,432,666 discloses preparing a cement binder, such as Portland cement, and a fine-grained waste which can include heavy metals, pouring the same into a container, and allowing the admixture to harden in the container.

SUMMARY OF THE INVENTION

The present invention relates to the cementitious encapsulation of waste material and/or contaminated soils containing havy metals, to render them immobile, and particularly to the immobilization of heavy metals in such wastes and/or contaminated soils. A waste product comprising the heavy metals is provided. A mixture is prepared comprising said product, water, and a cementitious composition. The cementitious composition comprises magnesium oxide and magnesium chloride in proportions effective to produce, with said water, a magnesium oxychloride cement. The cementitious composition is present in an amount which, on setting, is effective to immobilize the heavy metals in said waste. The regulated wastes and/or contaminated soils and cementitious composition, following mixing, is introduced to a disposition site, and allowed to set and harden at said site.

For purposes of the present application, the term "cementitious composition" means reactive solids only which react to make the magnesium oxychloride cement. The term does not include water, which is an essential ingredient in the setting of magnesium oxychloride cement, nor does the term include such ingredients as fillers frequently used in the manufacture of cement products. The term does not include other reactive solid or liquid components, in addition to magnesium oxide and magnesium chloride, such as acids, phosphates, or aluminates, which may be added to achieve certain property modifications of the cement.

Also, for purposes of the present application, the term "water" means free water which is available to react with the cementitious composition of the present invention. The term does not include bound water.

A preferred mol ratio of magnesium oxide to magnesium chloride is in the range of about 1:2 to about 10:1, by weight.

More preferably, the mol ratio of magnesium oxide to magnesium chloride is in the range of about 2:1 to about 10:1.

The mixture of wastes and/or contaminated soil and cementitious composition can comprise up to about 80 percent of said volume of wastes and/or contaminated soils.

On a weight basis, the ratio of wastes and/or contaminated soils to cementitious composition, preferably, is in the range of about 5–70 percent cementitious composition to 95–30 percent wastes and/or contaminated soils.

The present invention also resides in the steps of providing wastes and/or contaminated soils in liquid, slurry, semi-solid, or solid form; reducing the particulate size of the solids in said wastes and/or contaminated soils; mixing with said wastes and/or contaminated soils magnesium chloride in solid or solution form, said magnesium chloride, following mixing, having a specific gravity of 20° to 30° Baume'; and then adding to the mixture of wastes and/or contaminated soils and magnesium chloride, magnesium oxide, in an amount effective to produce with said magnesium chloride a magnesium oxychloride cement.

DESCRIPTION OF PREFERRED EMBODIMENT

The metals which are immobilized, in accordance with the present invention, include those designated by the U.S. Environmental Protective Agency (EPA) as hazardous, pursuant to the Toxic Characteristic Leaching Procedure (TCLP).

The metals can be in ionized form, in solution, with anions. Examples of anions in such solutions include nitrates, phosphates, sulphates, fluorides, nitrites, sulphites, cyanides, sulphides, thiocyanates, thiosulphates, ferricyanides, and ferrocyanides. Also, the metal ions can be in solution with cations such as hydrogen and potassium; for instance, as potassium dichromate, or selenious acid.

The metals, or compounds thereof, can also be in solid form; for instance, as elemental metals, or a metal salt. The metals can also be in slurry form; for instance, as elemental metals or metal salts in a waste slurry. The heavy metals can also be in combinations of the above; for instance, in both an ionized and elemental state. Still further, the heavy metals can be combined with other waste materials. Examples of wastes containing the heavy metals may include, but are not limited to: mine tailings, pickling acids, spent caustic solutions, plating wastes, both electrical and electronic, sludges resulting from the neutralization, oxidation or precipitation of heavy metal wastes, refinery wastes, sulfur dioxide removal sludges, sewage wastes, organic or polymeric process wastes, for instance, from a petrochemical plant, paint and printing wastes, and pigment wastes.

The present invention is particularly useful for the remedial treatment of a landfill site. In such treatment, the landfill can be sectioned into treatment plots. A selected plot can be analyzed for contents; for instance, by core borings. Recyclables, particularly bulk recyclables such as glass, ferrous bulk metal items, non-ferrous bulk metal items, and bulk cellulosic items and paper, are first separated from the plot. The residue then may be crushed, or otherwise reduced to a particulate size; for instance about 1 inch or less, preferably about ½ inch, average particle diameter. If the analysis shows that the residue contains leachable amounts of heavy metals, the residues are then mixed with the cementitious composition of the present invention, and introduced to a disposition site. An example of a preferred disposition site is an enclosure or container.

Alternatively, the disposition site can be a designated site of the landfill.

If the heavy metal waste material and/or contaminated soils is a waste solution or slurry containing significant levels of regulated metals, the solution, or slurry, may first be analyzed for its contents and composition, and then mixed, at a disposition site, for instance, in an enclosure or container, with the cementitious composition of the present invention. The mixture of heavy metal waste and/or contaminated soils and cementitious composition is then allowed to cure and harden, immobilizing the heavy metals in the solution or slurry, and in the resulting solidification of said mass.

The cementitious ingredients of the present invention comprise a mixture of magnesium oxide and magnesium chloride. The magnesium oxide and magnesium chloride, in the presence of water, react to produce a magnesium oxychloride or Sorel cement, according to the following equations:

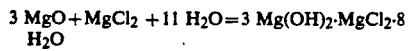

$$3\ MgO + MgCl_2 + 11\ H_2O = 3\ Mg(OH)_2 \cdot MgCl_2 \cdot 8\ H_2O$$

and

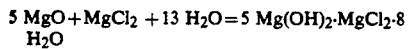

$$5\ MgO + MgCl_2 + 13\ H_2O = 5\ Mg(OH)_2 \cdot MgCl_2 \cdot 8\ H_2O$$

The mol ratio of magnesium oxide to magnesium chloride can be in the range of about 1:2 to about 10:1.

At a mol ratio of about 1:2 to about 2:1, excess magnesium chloride is present. The excess magnesium chloride binds to the molecular structure of those components of the waste and/or contaminated soil which contain charged ends or polar groups. This forms structural bonds in the end product, increasing the strength of the end product.

If excess magnesium chloride is neither required nor desired, a preferred mol ratio is in the range of 3:1 to about 10:1, more preferably in the range of about 3:1 to about 7:1, of magnesium oxide to magnesium chloride.

The proportions of heavy metal waste and/or contaminated soils to the magnesium oxychloride reactants is dependent, in part, on the amount of water in the waste. Broadly, the wastes and/or contaminated soils (including free water and any ingredients such as fillers added to the wastes and/or contaminated soils) can comprise, on a volume basis, up to about 80% of the combined volume of wastes and/or contaminated soils and cementitious composition. On a weight basis, the ratio of wastes and/or contaminated soils (including free water and added ingredients such as filler) preferably, is in the range of about 5–70% cementitious composition to 95–30% wastes and/or contaminated soils.

If water is present in the wastes and/or contaminated soils, it is desirable to add the magnesium chloride first to the waste and/or contaminated soils, and then the desired amount of magnesium oxide to react with the magnesium chloride. If the magnesium oxide is mixed first with the wastes and/or contaminated soils, and the wastes and/or contaminated soils contains water, the magnesium oxide tends to hydrate and form magnesium hydroxide, which is non-reactive with magnesium chloride.

The magnesium chloride, prior to reaction with the magnesium oxide, desirably has a specific gravity in the range of about 20° to about 30° Baume', preferably in the range of 21° Baume' to about 26° Baume'. If the Baume' is not correct, a rapid reaction of the reactants can take place, interfering with complete reaction of the reactants.

When the wastes and/or contaminated soils are a solution or a slurry, and the disposition site is an enclosure or container, a preferred order of addition is to: (a) add magnesium chloride to about 10–20 volume percent of the enclosure or container; (b) add said wastes and/or contaminated soils up to a level, combined with the magnesium chloride, of about 50–70 volume percent of the enclosure or container; (c) the magnesium chloride following the wastes and/or contaminated soils addition having a specific gravity of 20° to 30° Baume'; and (d) adding magnesium oxide to the enclosure in the mol ratio, to magnesium chloride, of about 3:1 to about 10:1.

If no free water is present in the wastes and/or contaminated soils, or only a small amount of free water is present, a preferred sequence of addition is to first add magnesium chloride to the wastes and/or contaminated soils, in a volume percent which is dependent upon the composition of the wastes and/or contaminated soils, and within the parameters set forth herein, and then to add water to the wastes and/or contaminated soils to achieve a Baume' in the range of about 20° to about 30°. The magnesium oxide, in the desired proportion to react with the magnesium chloride, is then added to the wet mixture of wastes and/or contaminated soils and magnesium chloride.

Other ingredients, than the wastes and/or contaminated soils product being treated, can be mixed with the cementitious composition of the present invention.

For instance, where the wastes and/or contaminated soils includes large wastes and/or contaminated soils masses, not prone to aggregation even after reduction by pulverization, a polymer can be added to provide integral physical strength to the hardened, cementitious mass. Also, reinforcing material or fillers such as glass, plastic, or metal fibers, fly ash, and other such ingredients, traditionally added to cementitious materials to achieve certain desired properties, can be added to the cementitious composition of the present invention.

Also, it is well known that ingredients such as phosphates and aluminates can be added. These ingredients have been suggested in the prior art to form insoluble magnesium salts to achieve certain properties in the end product.

The following example illustrates the present invention.

EXAMPLE

A concentrated solution was prepared from the salts of eight regulated metals. The metals were selected as being representative of a hazardous waste pursuant to the toxic characteristics leaching procedure (TCLP), defined by the U.S. Environmental Protection Agency (EPA), when present in the leachate in excess of prescribed values. The leachate is obtained by performing a leaching test procedure as published by the Environmental Protection Agency at Title 40, Code of Federal Regulations, Part 261, Appendix II. The salts are listed in the following Table 1.

TABLE 1

| SALTS OF EIGHT METALS | | |
|---|---|---|
| Type of Salt | % Element in Salt | mg of Element in salt |
| Arsanilic acid | 34.5 As | 1500 |
| Barium Nitrate | 52.5 Ba | 30,000 |
| Cadmium Nitrate | 36.8 Cd | 300 |
| Potassium Dichromate | 35.4 Cr | 1500 |
| Lead Nitrate | 54.6 Pb | 1500 |
| Mercuric Nitrate | 58.6 Hg | 60 |
| Selenous Acid | 54.5 Se | 300 |
| Silver Nitrate | 63.5 Ag | 1500 |

All the metal salts were solubilized in 2000 milliliters (ml) of deionized water containing 4 ml of concentrated nitric acid. The concentrations of the eight elements listed in Table 1, in the solution, are given in the following Table 2. This solution was designated Sample A.

TABLE 2

| TOTAL METAL CONCENTRATION - SAMPLE A | |
|---|---|
| Element | Total Concentration (mg) |
| Arsenic (As) | 1500 |
| Barium (Ba) | 30,000 |
| Cadmium (Cr) | 300 |
| Chromium (Cr) | 1500 |
| Lead (Pb) | 1500 |
| Mercury (Hg) | 60 |
| Selenium (Se) | 300 |
| Silver (Ag) | 1500 |

A second sample, Sample B, was prepared by diluting Sample A with deionized water, as follows:

| | |
|---|---|
| 667 ml of Sample A | |
| 337 ml of deionized water | |
| 1000 ml | (Sample B) |

Sample B contained the following concentration, per 1000 ml, of the eight chemicals listed in Table 1, set forth in Table 3. Table 3 states the regulatory limits for the eight metals, in a waste water solution or slurry, as established by the U.S. Environmental Protection Agency (EPA).

TABLE 3

| TOTAL METAL CONCENTRATION - SAMPLE B | | |
|---|---|---|
| Element | Regulatory Level (RL) mg/L or ppm | Metal Concentration* mg/L or ppm |
| Arsenic | 5.0 | 500 |
| Barium | 100.0 | 10,000 |
| Cadmium | 1.0 | 100 |
| Chromium | 5.0 | 500 |
| Lead | 5.0 | 500 |
| Mercury | 0.2 | 20 |
| Selenium | 1.0 | 100 |
| Silver | 5.0 | 500 |

*Concentration 100 times Regulatory Level (40 CFR 261.24)

As indicated in Table 3, the concentrations of metals in Sample B were 100 times the regulatory levels permitted by the Environmental Protection Agency, pursuant to the Toxic Characteristics Leaching Procedure (TCLP), defined at 40 CFR 261.24 and 40 CFR 261 Appendix II.

One liter of Sample B was transferred to a one gallon container. 315 grams of magnesium chloride were added to the Sample B. The Sample B and the magnesium chloride were thoroughly mixed. Magnesium oxide, in the amount of 403 grams, was added to the mixture, and the mixing was continued. The ratio of 403 grams of magnesium oxide to 315 grams of magnesium chloride provided a mol ratio of magnesium oxide to magnesium chloride of about 3:1.

The resultant mixture was then poured into three containers, and each was dried for a period of one week, at ambient temperature. Curing and solidification of the mixture took place in that one week period.

The three containers were subjected to extraction, in order to analyze the leaching behavior of the eight metals. The extractions were carried out using the EPA extraction method published at 40 CFR 261, Appendix II. The extraction test on the second container followed the extraction test on the first container by about 3 days. That on the third container followed that on the second container by about 23 days. The results are given in the following Table 4.

In the following Table 4, the letters RL, DL and BDL have the following meanings:
RL=Regulatory Limit
DL=Detection Limit
BDL=Below Detection Limit

TABLE 4

| LEACHING CHARACTERISTICS OF TEST METALS | | | | | |
|---|---|---|---|---|---|
| Element | DL mg/L | RL mg/L | Container 1 | Container 2 | Container 3 |
| Arsenic | 0.089 | 5.0 | BDL | BDL | BDL |
| Barium | 0.021 | 100.0 | 283 | 291 | 282 |
| Cadmium | 0.01 | 1.0 | BDL | BDL | BDL |
| Chromium | 0.023 | 5.0 | BDL | BDL | BDL |
| Lead | 0.017 | 5.0 | BDL | BDL | BDL |
| Mercury | 0.0005 | 0.2 | BDL | BDL | BDL |
| Selenium | 0.116 | 1.0 | 0.61 | 1.04 | 0.91 |
| Silver | 0.007 | 5.0 | 0.6 | 0.51 | 0.34 |

As can be seen from Table 4, six of the metals, namely: arsenic, cadmium, chromium, lead, mercury, and silver showed no leachable characteristics. The leach water contained levels of these metals below detection limit.

The test results showed, in all three tests, extracts containing detectable amounts of silver, but well below regulatory limits. The analytical data concerning selenium revealed poor reproducibility. The amount of selenium detected varied considerably, within and above the regulatory limit. The analyses showed, in all instances, amounts of barium above regulatory limits. It should be noted, however, that the barium concentration in the prepared sample is in several orders of magnitude greater than those experienced in real world samples. It is reasonably expected that the leachate of a normal sample, immobilized according to the present invention, will contain barium at a concentration below 100.0 mg/L.

Also, based on the above tests, and other data, it is believed that the barium and selenium can be immobilized, if necessary, by increasing the amount of the cementitious composition added to the waste. The presence of these two elements in the waste and/or contaminated soils, can easily be determined in the analysis of the waste and/or contaminated soils. The amount of the cementitious composition used is then adjusted appropriately. Also, mol levels of the magnesium oxychloride reactants, other than 3:1 can be used to immobilize the toxic metals. Other techniques, well known in the art, can also be used to immobilize those metals of which some leaching is expected or actually occurs.

The present invention provides a method for cementitious encapsulation of regulated metals in a magnesium oxychloride cement medium that has qualities known and superior to Portland and lime cements, particularly as to the resistance of magnesium oxychloride cements to deterioration in the presence of acid and alkaline substances and environments. In addition, magnesium oxychloride cements have known, superior qualities of resistance to abrasion, and tolerate heat absorption as, for example, a castable, binding medium in industrial grinding wheels, and as a binding, cementitious agent for stone and other aggregates as, for example, in terrazzo floors.

Advantages of the present invention should be apparent. In addition to providing excellent immobilization of regulate metals, the reactants, magnesium chloride and magnesium oxide, are readily available, and relatively inexpensive. For instance, magnesium chloride is commercially available as a by-product, e.g., a waste liquor, from a potash (potassium chloride) producing facility. Brine, for instance, from the Great Salt Lake, in Utah, is conducted to a settling pool where sodium chloride, due to natural evaporation, precipitates out of solution. When the brine becomes sufficiently concentrated, it is pumped to a plant where potash is removed from the brine by flotation. The remaining residual liquor is a highly concentrated solution of magnesium chloride. This brine is directly useable as one of the reactants in the process of the present invention. If added to dry waste ingredients, water can present invention. If added to dry waste ingredients, water can be added in addition to the magnesium chloride solution to achieve the desired Baume' specific gravity. If added to a solution of regulated metals, in the above example, water adjustment may or may not be necessary.

From the above description of the invention, those skilled in the art will perceive improvements, changes and modifications. Such improvements, changes and modifications, within the skill of the art, are intended to be covered by the appended claims.

Having described the invention, the following is claimed:

1. A process for the cementitious encapsulation of wastes and/or contaminated soils containing heavy metals, to render such metals immobile, comprising one and/or more metals in a regulated amount, comprising the steps of:
   (a) providing said wastes and/or contaminated soils;
   (b) providing a mixture comprising said wastes and/or contaminated soils, water, and a cementitious composition;
   (c) said cementitious composition consisting essentially of magnesium oxide and magnesium chloride in proportions effective to produce, with said water, a magnesium oxychloride cement;
   (d) the amount of cementitious composition being an effective amount which, on setting, immobilizes the heavy metal or metals;
   (e) introducing said mixture to a disposition site; and
   (f) allowing said cementitious composition to set and harden at said disposition site.

2. The process of claim 1 wherein the mol ratio of magnesium oxide to magnesium chloride is in the range of about 1:2 to about 10:1.

3. The process of claim 1 wherein the mol ratio of magnesium oxide to magnesium chloride is in the range of about 2:1 to about 7:1.

4. The process of claim 1 wherein the mol ratio of magnesium oxide to magnesium chloride is in the range of about 3:1 to about 5:1.

5. The process of claim 1 wherein the mixture of wastes and/or contaminated soils and/or containing heavy metals and cementitious composition comprises up to 80 volume percent waste and/or contaminated soils.

6. The process of claim 1 wherein the wastes and/or contaminated soils and cementitious composition are mixed in the ratio of about 5–70 weight percent cementitious composition to about 95–30 weight percent wastes and/or contaminated soils.

7. The process of claim 1 wherein said disposition site is an enclosure.

8. The process of claim 1 comprising the steps of:
   a) mixing said wastes and/or contaminated soils containing heavy metals first with magnesium chloride;
   b) providing the mixture of wastes and/or contaminated soils and magnesium chloride with a magnesium chloride specific gravity in the range of about 20° to about 30° Baume'; and
   c) adding to said mixture, of wastes and/or contaminated soils and magnesium chloride, magnesium oxide in a proportion effective to produce magnesium oxychloride cement.

9. The process of claim 8 wherein said wastes and/or contaminated soils containing heavy metals is in slurry, semi-solid, or solid form including the step of reducing the particle size of the solids in said wastes and/or contaminated soils, prior to mixing the wastes and/or contaminated soils with magnesium chloride.

10. The process of claim 9 wherein the reduction in particle size is to an average particle diameter of less than about one inch.

11. The process of claim 8 wherein said disposition site is an enclosure or container, comprising the steps of:

a) adding magnesium chloride to said enclosure to about 10–20 volume percent of the enclosure;

b) adding said wastes and/or contaminated soils containing heavy metals to said enclosure to a level, combined with the magnesium chloride, of about 50–70 volume percent; and c) adding magnesium oxide to said enclosure in a mol ratio of about 3:1 to about 10:1 magnesium oxide to magnesium chloride.

* * * * *